C. A. CARMAN.
VEHICLE.
APPLICATION FILED FEB. 26, 1908. RENEWED SEPT. 29, 1910.
992,754.
Patented May 23, 1911.
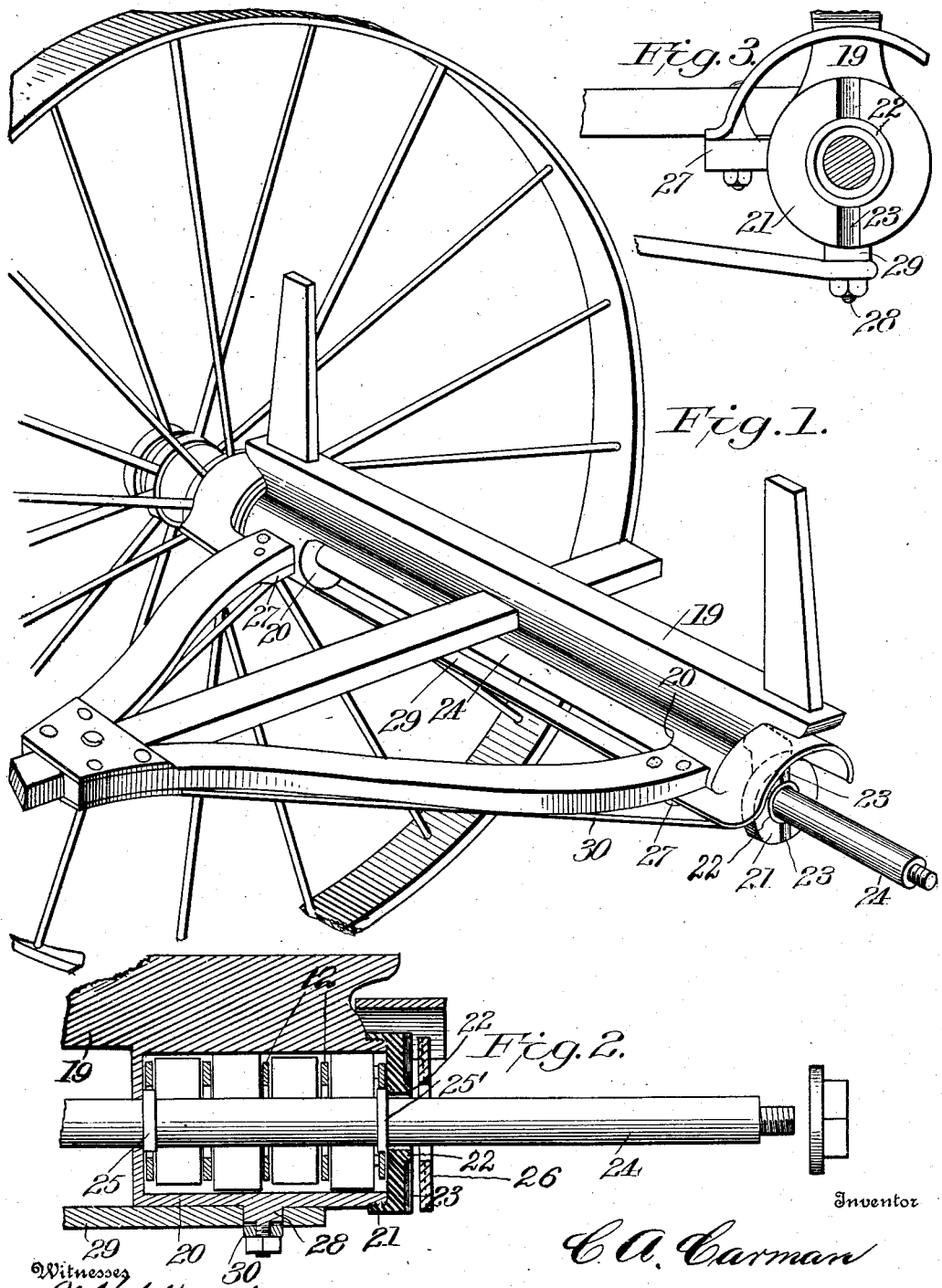

UNITED STATES PATENT OFFICE.

CLARENCE A. CARMAN, OF ISLIP, NEW YORK.

VEHICLE.

992,754. Specification of Letters Patent. Patented May 23, 1911.

Application filed February 26, 1908, Serial No. 417,882. Renewed September 29, 1910. Serial No. 584,573.

*To all whom it may concern:*

Be it known that I, CLARENCE A. CARMAN, a citizen of the United States, residing at Islip, in the county of Suffolk and State of New York, have invented a new and useful Vehicle, of which the following is a specification.

This invention relates to the construction of running gear for vehicles, the purpose being to provide an axle support of novel construction in which a bolster, housings for anti-friction axle supporting bearings are formed substantially of a single piece, the housings being connected one to the other by a brace, such housings also being provided with means for attaching the hounds of the running gear thereto, and brace-rods for the hounds or running gear, as will be hereinafter more fully set forth, the construction of the parts being such that a cylindrical bar may be used as an axle, such axle being held in place by the hubs which turn on the axle, the housings having anti-friction devices maintained therein to provide bearings for the axle.

The construction or make-up of the parts constituting my invention are such as to provide a rigid support for the axle, housings for the reception of anti-friction bearings, and an axle that extends beyond the housings and bolsters to carry the hubs of the wheels.

A bolster and axle support made in accord with my invention is of metal, preferably cast, and is particularly adapted for use in connection with such vehicles as are made of metal, and are used for the collection of garbage, or for vehicles of a character which are subject to rough usage, and the transportation of substances which would be more or less injurious to wood.

In the accompanying drawings Figure 1 is a perspective of a part of the running gear of a vehicle made in accord with my invention. Fig. 2 is a sectional view showing one of the housings which is formed integral with the bolster, and Fig. 3 is an end view, the axle being shown in section.

Referring to the drawings 19 designates the bolster which is provided adjacent to its end with the usual openings for the reception of the ends of standards, the ends of the bolster being undercut and provided with depending housings 20, which are preferably formed integral with the bolster, and are made up to provide cylinders which are formed at their open outer ends to receive caps 21. The outer faces of the caps 21, about the openings therethrough have outwardly extending circumferential flanges 22 and recesses 23 for the reception of wear-plates 26, said wear-plates being made up to provide on their inner faces ribs which enter the recesses 23 and hold the wear plates against rotation, these wear-plates abut against the inner surface of the hub and prevent wear of the outer faces of the cap 21.

Each of the housings 20 have formed thereon lugs 28, with depending screw-threaded portions adapted to receive nuts to hold thereon a transverse brace-bar 29 and a brace-rod 30. The rigid bolster is braced by the transverse bar 29, and this bar serves to hold the housings in alinement when the bolster is subject to strains. The construction shown locates the axle 24 below the bolster and above the brace 29. The housings each have forwardly projecting lugs 27 with apertures therethrough for the passage of bolts used to connect hounds or other parts of the running gear to the lugs, and maintained between the lugs and the ends of the hounds are shields or plates which serve as dust guards, such dust guards extending below the cut-away end portions of the bolster. The lugs 27, project forward to carry the rear ends of the hounds, and when on the front axle the spreaders of the wagon pole may be connected thereto. The brace-rods 30 extend from the forward ends of the hounds to the lugs 28.

The axle 24 is made up of a cylindrical bar of greater length than the bolster, the ends thereof projecting beyond the housing to carry the hubs of the wheels. The hubs have anti-friction bearings of any suitable construction, and the inner faces of said hubs contact with the wear plates 26 and are held upon the axle by nuts applied in the usual manner.

In assembling the parts the caps are removed from the housings, and upon the axle when passed through the housing is first placed a collar 25, the anti-friction bearings 12 are then placed over the ends of the axle and are slid within the housing and another collar 25' is then placed on the axle. The collars lie within the end-connecting rings for the anti-friction bearings and between the inner ends of the housing and the cap. When the caps 21 are screwed in place wear-plates 26 are placed over the axle and the hubs are placed upon its projecting ends being held thereon by the nuts which engage the ends of the axle. By means of this construction the wheels may turn on the ends of the axle and the axle may turn independently of the wheels in the housings, and when desired by removing one of the wheels the axle can be readily withdrawn without disorganizing the assemblage of the parts.

The collars 25 and 25' within the housings, are of slightly greater width than the rings which carry the anti-friction rollers to prevent the rings engaging the cap and housing.

The construction shown provides a cast metal bolster with integral housings for the reception of anti-friction roller-bearings and with integral means for attaching parts of the running gear thereto, and a brace-rod which assists in holding the housings in alinement.

Having thus set forth my invention, I do not wish to be limited to any particular construction shown and described, as obviously the improvement may be modified as to details without departing from the spirit of my invention, as evidenced by the claims.

I claim:

1. In running gear for vehicles, a bolster, housings for anti-friction bearings carried by and depending from the under side of the bolster, said housings having end walls with openings therethrough for the passage of a revoluble axle and a transverse brace-rod attached at its ends to the housings to be maintained parallel with the bolster and axle.

2. In running gear for vehicles, a bolster, housings for anti-friction bearings carried by and depending from the under side of the bolster said housings having end walls with openings therethrough for the passage of a revoluble axle, a transverse brace-rod attached at its ends to the housings to be maintained parallel with the bolster and axle and lugs which project from the housings for attachment thereto of parts of the running gear.

3. The combination with a bolster having a housing at each end, of an axle mounted to rotate within the housings said axle being of greater length than the bolster, anti-friction devices within each housing to surround the axle, a cap upon each housing, wear-plates between the caps and the hubs of wheels when mounted on the axle, spacing collars upon the axle and between the ends of each housing the collars contacting with the ends of anti-friction devices and positioned to project into and to be surrounded by the end rings of such anti-friction devices, substantially as shown, and for the purpose set forth.

4. In running gear for vehicles, a bolster provided adjacent to its ends with depending housings which are open at one end and are provided at the other end with a wall having an aperture therethrough, caps or inclosures for engagement with the housings the same having centrally located openings and diametrical recesses formed in the outer surface of the caps, wear-plates having projecting portions for engagement with the recesses and hubs revolubly mounted upon the axle.

5. In a running gear for vehicles, a bolster provided at its ends with depending housings which are formed integral with the bolster, an axle of sufficient length to extend beyond the housings, a series of anti-friction devices carried by the axle and located within the housings and hubs revoluble upon the projecting ends of the axle.

6. In a running gear for vehicles, a bolster provided with integrally formed and depending housings for the reception of anti-friction bearings; said housings being open at their outer ends and being provided thereat with external threads, the inner end walls of each of the housings having therethrough an opening for the passage of an axle, apertured caps for engagement with the threaded ends of the housings, an axle of a length sufficient to extend beyond the caps to receive hubs which are revoluble upon the projecting ends of the axle and anti-friction devices within the housings that engage the housings and the axle.

7. In running gear for vehicles, a bolster provided with integral housings that depend therefrom; the inner walls of the housings having therethrough centrally located openings for the passage of an axle, anti-friction bearings located within the housings to contact with the interior of the housings and with the exterior of the axle, caps through which the axle is passed said caps being removably secured to the housings, collars mounted on the axle within the housings, an axle of sufficient length to extend beyond the caps and hubs maintained upon the ends of the axle.

8. In running gear for vehicles, a bolster provided adjacent to its ends with depending housings; each housing being open at one end and partially closed at the opposite end, an axle of greater length than the distance between the housings, anti-friction devices mounted on the axle to engage therewith and with the inner surfaces of the housings, caps carried by the housings, hubs revolubly mounted on the ends of the axle and wear plates between the caps and the hubs said wear plates and caps being maintained in non-rotatable engagement when the hubs are in place.

In testimony that I claim the foregoing as my own, I have hereto affixed my signature in the presence of two witnesses.

CLARENCE A. CARMAN.

Witnesses:
HARRIET G. VOLKMAR,
FRANK STROUD.

Copies of this patent may be obtained for five cents each, by addressing the "Commissioner of Patents, Washington, D. C."